(12) United States Patent
Nakao (10) Patent No.: US 10,176,787 B2
(45) Date of Patent: *Jan. 8, 2019

(54) INFORMATION PROCESSING APPARATUS AND INFORMATION PROCESSING METHOD FOR OCCLUSION AVOIDANCE IN TABLETOP DISPLAYS

(71) Applicant: SONY CORPORATION, Tokyo (JP)

(72) Inventor: Isamu Nakao, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,977

(22) Filed: Oct. 28, 2016

(65) Prior Publication Data

US 2017/0047049 A1    Feb. 16, 2017

Related U.S. Application Data

(63) Continuation of application No. 13/467,379, filed on May 9, 2012.

(30) Foreign Application Priority Data

Jun. 3, 2011    (JP) ................ 2011-124909

(51) Int. Cl.
| | | |
|---|---|---|
| *G06F 3/03* | (2006.01) | |
| *G09G 3/00* | (2006.01) | |
| *G09G 3/36* | (2006.01) | |
| *G09G 5/38* | (2006.01) | |

(52) U.S. Cl.
CPC ............ *G09G 5/38* (2013.01); *G06F 3/0304* (2013.01); *G09G 3/003* (2013.01); *G09G 3/36* (2013.01); *G09G 2340/0464* (2013.01); *G09G 2340/14* (2013.01); *G09G 2354/00* (2013.01)

(58) Field of Classification Search
CPC ....................................... G09G 5/38
USPC ....................................... 345/672
See application file for complete search history.

(56) References Cited

U.S. PATENT DOCUMENTS

| | | | |
|---|---|---|---|
| 6,614,422 B1 | 9/2003 | Rafii et al. | |
| 7,394,459 B2 | 7/2008 | Bathiche et al. | |
| 7,479,967 B2 | 1/2009 | Bachelder et al. | |
| 7,626,569 B2 * | 12/2009 | Lanier | G06F 1/1601 |
| | | | 345/156 |
| 7,876,333 B2 | 1/2011 | Van Ieperen | |
| 7,907,128 B2 | 3/2011 | Bathiche et al. | |

(Continued)

FOREIGN PATENT DOCUMENTS

| | | |
|---|---|---|
| JP | 2004-271866 A | 9/2004 |
| JP | 2004-302124 A | 10/2004 |

(Continued)

OTHER PUBLICATIONS

"A Pattern Language for Interactive Tabletops in Collaborative Workspaces" Christian Remy et al. Interact '99, New York, 2001.*

(Continued)

*Primary Examiner* — Javid A Amini
(74) *Attorney, Agent, or Firm* — Chip Law Group (57) ABSTRACT

According to an illustrative embodiment, an image display method is provided. The method includes detecting a position of a user, detecting a position of a physical object, and defining a non-display area of a display based on the position of the user and the position of the physical object.

12 Claims, 11 Drawing Sheets

(56) References Cited

U.S. PATENT DOCUMENTS

| | | | |
|---|---|---|---|
| 7,934,171 B2 | 4/2011 | Hey et al. | |
| 8,300,894 B2 | 10/2012 | Chien et al. | |
| 8,584,029 B1 | 11/2013 | Gerde et al. | |
| 8,670,034 B2 | 3/2014 | Hattori et al. | |
| 8,736,547 B2 | 5/2014 | Goddi et al. | |
| 8,884,883 B2 | 11/2014 | Benko et al. | |
| 8,913,057 B2 | 12/2014 | Ishige et al. | |
| 9,791,947 B2* | 10/2017 | Sugimoto | G06F 3/0488 |
| 2004/0150619 A1 | 8/2004 | Baudisch et al. | |
| 2004/0196371 A1 | 10/2004 | Kono et al. | |
| 2005/0212914 A1* | 9/2005 | Seto | H04N 1/00143 |
| | | | 348/207.1 |
| 2006/0010400 A1 | 1/2006 | Dehlin et al. | |
| 2006/0050948 A1 | 3/2006 | Sumida et al. | |
| 2006/0079033 A1* | 4/2006 | Machida | H01L 21/0242 |
| | | | 438/149 |
| 2006/0122769 A1 | 6/2006 | Hotehama | |
| 2006/0128030 A1* | 6/2006 | Mamine | G01N 21/6428 |
| | | | 436/518 |
| 2006/0274046 A1* | 12/2006 | Hillis | G06F 3/04883 |
| | | | 345/173 |
| 2007/0064004 A1* | 3/2007 | Bonner | G06F 3/04883 |
| | | | 345/442 |
| 2007/0103461 A1 | 5/2007 | Suzuno et al. | |
| 2007/0226636 A1* | 9/2007 | Carpenter | G06F 3/048 |
| | | | 715/751 |
| 2007/0300182 A1 | 12/2007 | Bilow | |
| 2008/0231611 A1* | 9/2008 | Bathiche | A63F 13/00 |
| | | | 345/175 |
| 2008/0316145 A1 | 12/2008 | May | |
| 2009/0237763 A1* | 9/2009 | Kramer | G03H 1/0005 |
| | | | 359/23 |
| 2009/0322678 A1* | 12/2009 | Lashina | G06Q 30/02 |
| | | | 345/158 |
| 2010/0141553 A1 | 6/2010 | Berhorst et al. | |
| 2010/0177931 A1* | 7/2010 | Whytock | G06F 3/0416 |
| | | | 382/103 |
| 2010/0182340 A1 | 7/2010 | Bachelder et al. | |
| 2010/0209069 A1 | 8/2010 | Fountaine | |
| 2010/0245387 A1 | 9/2010 | Bachelder et al. | |
| 2011/0187664 A1* | 8/2011 | Rinehart | G06F 3/041 |
| | | | 345/173 |
| 2011/0263326 A1* | 10/2011 | Gagner | G07F 17/3211 |
| | | | 463/34 |
| 2011/0279674 A1 | 11/2011 | Ichinose et al. | |
| 2012/0001879 A1 | 1/2012 | Lee et al. | |
| 2012/0032979 A1 | 2/2012 | Blow et al. | |
| 2012/0045742 A1 | 2/2012 | Meglan et al. | |
| 2012/0162083 A1 | 6/2012 | Zhu | |
| 2012/0206339 A1 | 8/2012 | Dahl | |
| 2012/0219179 A1 | 8/2012 | Osako | |
| 2012/0229610 A1 | 9/2012 | Fukushima et al. | |
| 2013/0095924 A1 | 4/2013 | Geisner et al. | |
| 2013/0114797 A1* | 5/2013 | Zaiki | A61B 6/04 |
| | | | 378/195 |
| 2013/0184064 A1* | 7/2013 | Manning | G07F 17/3211 |
| | | | 463/25 |
| 2014/0044141 A1 | 2/2014 | Bouliniere | |

FOREIGN PATENT DOCUMENTS

| | | |
|---|---|---|
| JP | 2005-227487 A | 8/2005 |
| JP | 2005-317032 A | 11/2005 |
| JP | 2005-345709 A | 12/2005 |
| JP | 2008-217742 A | 9/2008 |
| WO | 2010/089989 A1 | 8/2010 |

OTHER PUBLICATIONS

"Rethinking 'multi-user' an in-the-wild study of how groups approach a walk-up-and-use tabletop interface" Paul Marshall, Richard Morris, Yvonne Rogers, Stefan Kreitmayer, Matt Davies May 2011 CHI '11: Proceedings of the SIGCHI Conference on Human Factors in Computing Systems.*

Office Action for JP Patent Application No. 2015-207706, dated Oct. 11, 2016, 4 pages.

Tandler, et al., "ConnecTables: Dynamic Coupling of Displays for the Flexible Creation of Shared Workspaces", Proceeding UIST '01 Proceedings of the 14th annual ACM symposium on User interface software and technology, Nov. 11-14, 2001, pp. 11-20.

Marshall, et al., "Rethinking 'Multi-User': An In-The-Wild Study of How Groups Approach A Walk-Up-And-Use Tabletop Interface", Proceeding CHI '11 Proceedings of the SIGCHI Conference on Human Factors in Computing Systems, May 7-12, 2011, pp. 3033-3042.

Shen, et al., "DiamondSpin: An Extensible Toolkit for Around-the-Table Interaction", Mitsubishi Electric Research Laboratories, Jan. 2004, 11 pages.

Remy, et al., "A Pattern Language for Interactive Tabletops in Collaborative Workspaces", Proceeding EuroPLoP 10 Proceedings of the 15th European Conference on Pattern Languages of Programs, Article No. 9, Jul. 7-11, 2010, 47 pages.

Office Action for JP Patent Application No. 2011-124909, dated Jan. 29, 2015.

Partial European Search Report for EP Patent Application No. 12169532.4, dated Oct. 15, 2012, 07 pages.

Communication from EP Patent Application No. 12169532A, dated Oct. 1, 2013. 05 pages.

Office Action for JP Patent Application No. 2015-207706, dated Feb. 7, 2017, 4 pages.

Office Action for JP Patent Application No. 2015-207706, dated Oct. 11, 2016, 04 pages.

Shen, et al., "DiamondSpin: An Extensible Toolkit for Around-the-Table Interaction", CHI Letters, vol. 6, No. 1, Apr. 24-29, 2004, pp. 167-174.

Tandler, et al., "ConnecTables: Dynamic Coupling of Displays for the Flexible Creation of Shared Workspaces", Proceedings of the 14th annual ACM symposium on User interface software and technology , UIST, Nov. 11-14, 2001, pp. 11-20.

Remy, et al., "A Pattern Language for Interactive Tabletops in Collaborative Workspaces", 2010, pp. 1-48.

Marshall, et al., "Rethinking 'Multi-user': An In-the-Wild Study of How Groups Approach a Walk-Up-and-Use Tabletop Interface", CHI, Vancouver, BC, Canada, May 7-12, 2011, pp. 3033-3042.

Non-Final Office Action cited in U.S. Appl. No. 13/467,379, dated Aug. 9, 2017, 13 pages.

Rethinking 'multi-user': an in-the-wild study groups approach a walk-up-and-use tabletop interface Paul Marshall, Richard Morris, Yvonne Rogers, Stefan Kreitmayer, Mall Davies, May 2011.

"A Pattern Language for Interactive Tabletops in Collaborative Workspaces" Christian Remy et al. Jul. 7-11, 2010.

"Interactive Environment-Aware Display Bubbles" Daniel Coiling et al., 2006.

"DIY design process for interactive surfaces" Jennifer G. Sheridan, James Tompkin, Abel Maciel, George Roussos, Sep. 2009.

Final Office Action issued in U.S. Appl. No. 13/467,379 dated Jan. 12, 2018.

Notice of Allowance in U.S. Appl. No. 13/467,379 dated Jul. 25, 2018.

* cited by examiner

INFORMATION PROCESSING APPARATUS AND INFORMATION PROCESSING METHOD FOR OCCLUSION AVOIDANCE IN TABLETOP DISPLAYS

CROSS-REFERENCE TO RELATED APPLICATION

The present application is a continuation application of U.S. patent application Ser. No. 13/467,379 filed May 9, 2012, which claims the benefit of Japanese Priority Patent Application JP 2011-124909 filed in the Japanese Patent Office on Jun. 3, 2011, the entire contents of which are incorporated herein by reference.

FIELD

The present disclosure relates to an information processing apparatus, an information processing method, and a program, and more particularly, to an information processing apparatus, an information processing method, and a program which can be suitably used in a case where a physical object can be placed on a display disposed on a table surface.

BACKGROUND

Figure 1A:
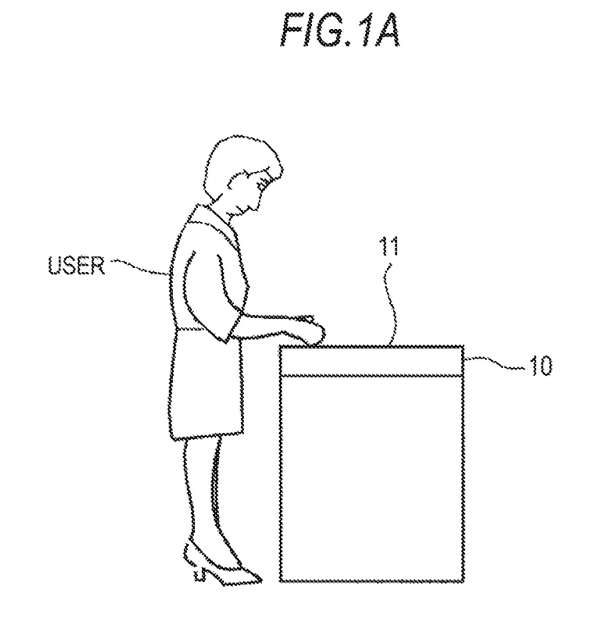
FIGS. 1A and 1B are diagrams illustrating an example of a table-top computer.
Figure 1B:
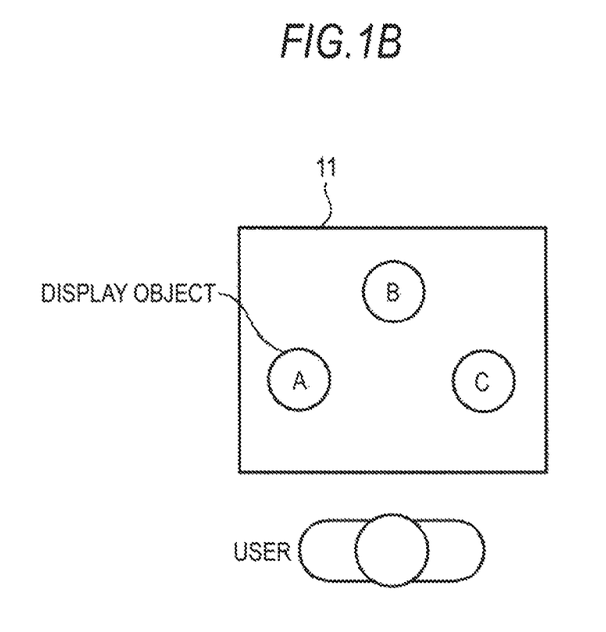

FIGS. 1A and 1B show an example of a computer called a table top type. The table-top computer 10 is used, for example, in a hotel counter and the like and a display 11 thereof is disposed on a table surface of the counter or the like.

When a user uses the table-top computer 10, the user is located on a side surface of the display 11 and watches a variety of information (display objects A, B, and C in this example) displayed on the display 11 obliquely from the upside as shown in FIG. 1A.

The display 11 of the table-top computer 10 is disposed on the table surface of the counter or the like and a physical object (an actual object such as a handbag, a book, and a cup) can be placed thereon.

However, when a physical object is placed on the display 11, the display objects displayed thereon at that time is not visible by the user and thus a certain countermeasure is necessary.

For example, US 2008/0231611 discloses that the position of a physical object placed on a display is specified by imaging the display from the upside thereof and a display position of a display object in the display is changed to avoid the position just below the physical object.

SUMMARY

Figure 2:
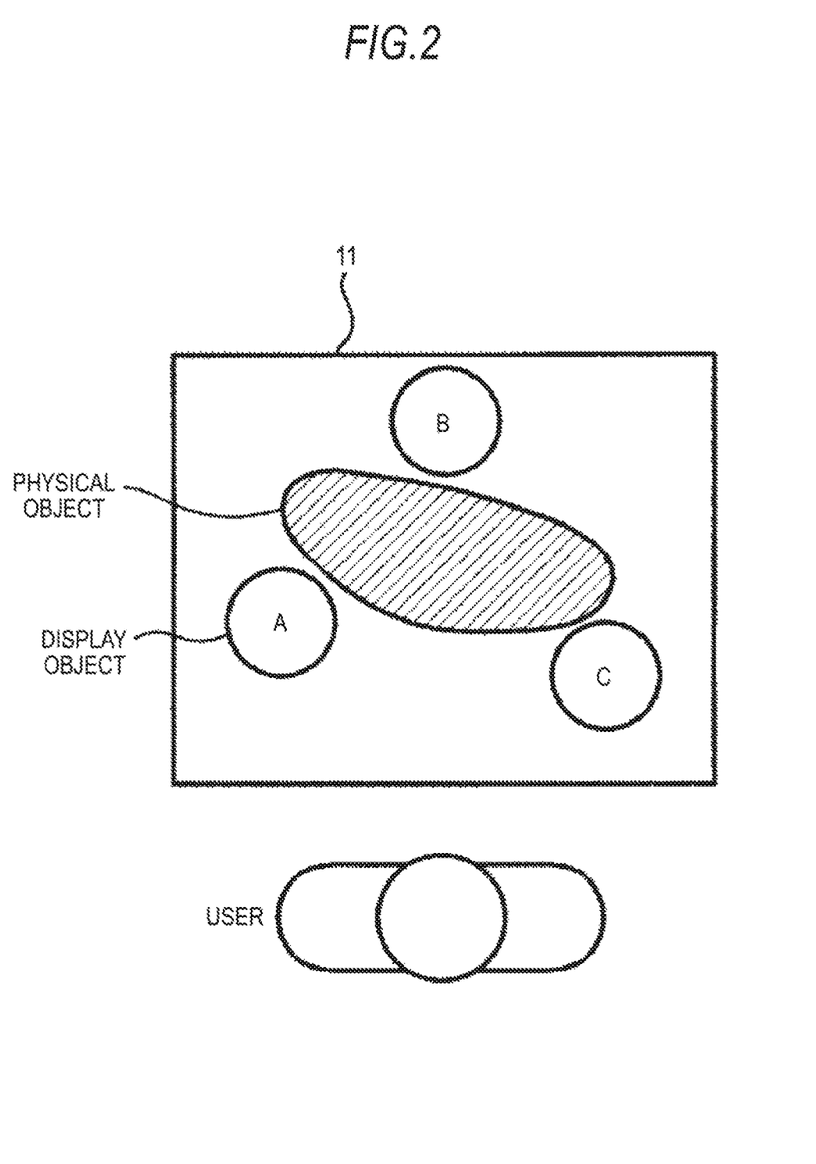
FIG. 2 is a diagram illustrating a state where a display object is made to move from the position just below a physical object placed on a display.

However, only by simply changing the display position of the display object to avoid the position just below the physical object, a display object B may move to the back of the physical object as viewed from the user, for example, as shown in FIG. 2. In this case, the user may not watch the display object B depending on the height (the length in the direction perpendicular to the display) of the physical object.

It is therefore desirable to cause a display object to move so as to easily watch the display object when a physical object is placed on a display.

Accordingly, the embodiments of the present disclosure are provided. According to an illustrative embodiment, an image display method is provided. The method includes detecting a position of a user, detecting a position of a physical object, and defining a non-display area of a display based on the position of the user and the position of the physical object.

DETAILED DESCRIPTION

Hereinafter, a best mode (hereinafter, referred to as an embodiment) for putting the present disclosure into practice will be described in detail with reference to the accompanying drawings.

1. Embodiment

[Schematic Operation of Information Processing Apparatus]

In an information processing apparatus according to an embodiment of the present disclosure, a physical object can be placed on a display disposed on a table surface, like a desk-top computer shown in FIGS. 1A and 1B.

Figure 3:
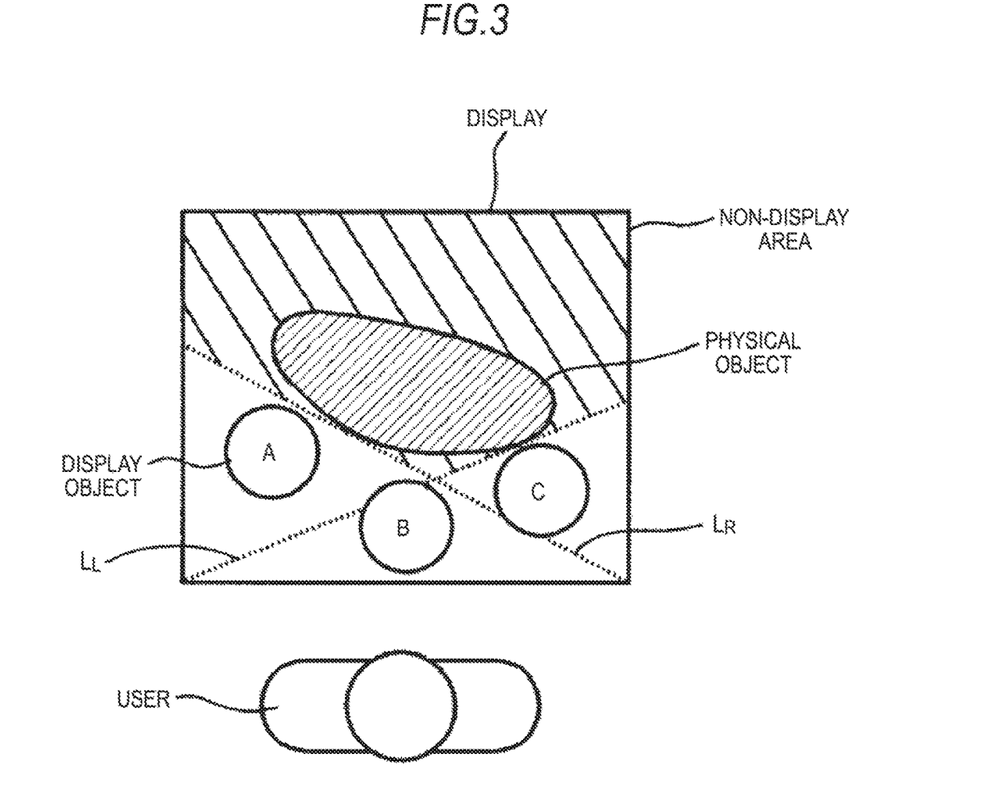
FIG. 3 is a diagram illustrating a state where a display object is made to move so as to avoid the physical object placed on the display according to an embodiment.

FIG. 3 shows a state where a display object is made to move to avoid a physical object placed on a display by the information processing apparatus according to the embodiment.

In the information processing apparatus according to the embodiment, it is detected that a physical object is placed on the display on the basis of an image signal from an imaging unit built in the display. When a physical object is placed on the display, as shown in the drawing, a non-display area having an end of the display on the user side and tangent lines LL and LR to the physical object is set and the display position of a display object displayed in the picture of the display moves to an area (hereinafter, referred to as a display area) other than the non-display area. A method of setting the non-display area will be described later. Accordingly, it is possible to suppress difficulty in watching the display object regardless of the height of the physical object placed on the display.

[Configuration of Information Processing Apparatus]

Figure 4:
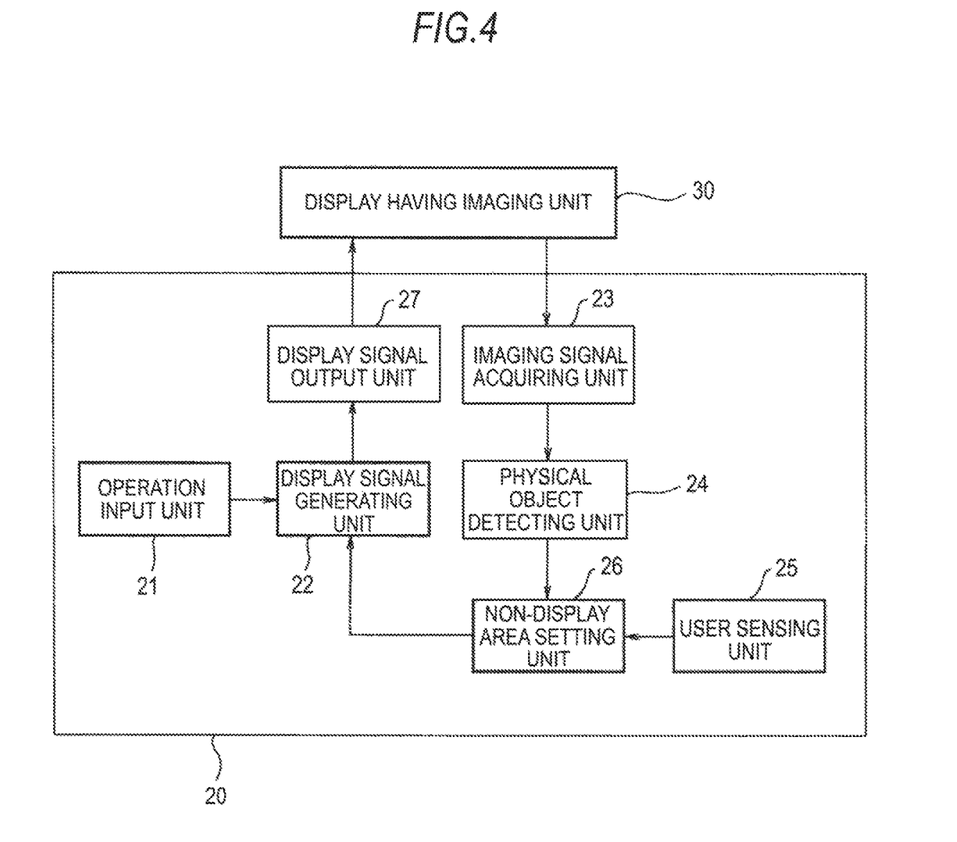
FIG. 4 is a block diagram illustrating the configuration of an information processing apparatus according to an embodiment.

FIG. 4 shows the configuration of the information processing apparatus according to the embodiment. The information processing apparatus 20 includes an operation input unit 21, a display signal generating unit 22, an image signal acquiring unit 23, a physical object detecting unit 24, a user sensing unit 25, a non-display area setting unit 26, a display signal output unit 27, and a display 30 having an imaging unit built therein.

The operation input unit 21 receives an operation input from a user and outputs an operation signal corresponding thereto to the display signal generating unit 22. The display signal generating unit 22 generates a display signal for displaying a picture including a display object and the like on the display 30 having an imaging unit built therein on the basis of the operation signal corresponding to the user's operation and supplies the generated display signal to the display signal output unit 27. The display signal generating unit 22 updates the display signal so as not to locate the display object in the non-display area on the basis of the position information of the non-display area supplied from the non-display area setting unit 26 and supplies the updated display signal to the display signal output unit 27.

The image signal acquiring unit 23 acquires an image signal from the display 30 having an imaging unit built therein (hereinafter, also simply referred to as a display 30) and outputs the acquired image signal to the physical object detecting unit 24. The physical object detecting unit 24 detects a closed curve C representing the profile of the physical object placed on the display 30 on the basis of the image signal from the display 30.

The user sensing unit 25 senses the side on which the user is located out of four sides surrounding the display 30 and notifies the non-display area setting unit 26 of the sensed side. For example, an infrared sensor, an ultrasonic sensor, and a human heat radiation sensor can be used as the user sensing unit 25. Alternatively, the position of the user may be sensed by urging the user to place the palm on the display 30 and detecting the profile of the palm on the basis of the image signal thereof.

The non-display area setting unit 26 sets a non-display area on the basis of the closed curve C representing the profile of the physical object placed on the display 30 and the position of the user and notifies the display signal generating unit 22 of the position information of the set non-display area.

A method of setting a non-display area will be described below. Hereinafter, four vertexes of the display 30 are defined as p0(0, 0), p1(0, X), p2(X, Y), p3(0, Y).

Figure 5:
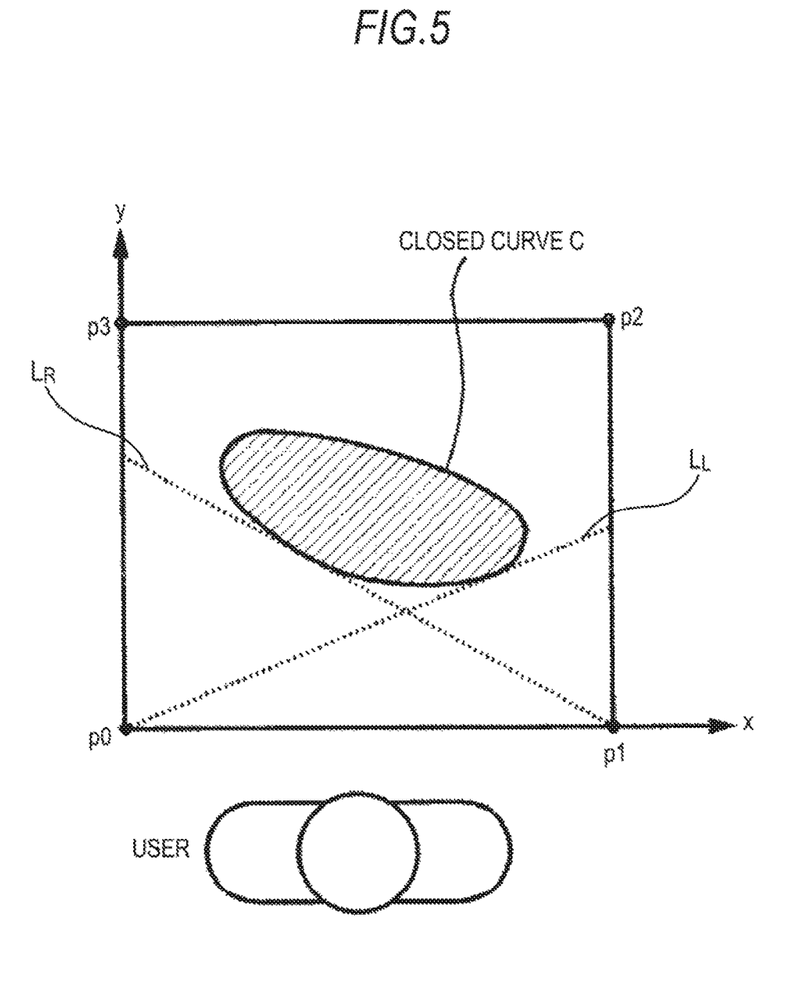
FIG. 5 is a diagram illustrating a non-display area setting method.

FIG. 5 shows a case where the user is located on the side of p0 and p1. In this case, the straight line $L_L$ passes through the vertex p0 and thus is expressed by Expression (1).

Straight line $L_L$: $y-0=a(x-0)$ (1)

A function F(x, y) expressed by Expression (2) is defined on the basis of Expression (1).

Function $F(x,y)=y-0-a(x-0)$ (2)

The values of the function F(x, y) for all points $c(x_c, y_c)$ in the existing closed curve C are calculated, parameter a is made to increase in the positive direction from 0, and parameter a when the value of the function F(x, y) is first 0 is employed as the slope of the straight line $L_L$.

The straight line LR is determined similarly. That is, the straight line LR passes through the vertex p1 and thus is expressed by Expression (3).

Straight line $L_R$: $y-0=a(x-X)$ (3)

A function F(x, y) expressed by Expression (4) is defined on the basis of Expression (3).

Function $F(x,y)=y-0-a(x-X)$ (4)

The values of the function F(x, y) for all points c(xc, yc) in the existing closed curve C are calculated, parameter a is made to decrease in the negative direction from 0, and parameter a when the value of the function F(x, y) is first 0 is employed as the slope of the straight line LR.

Figure 6:
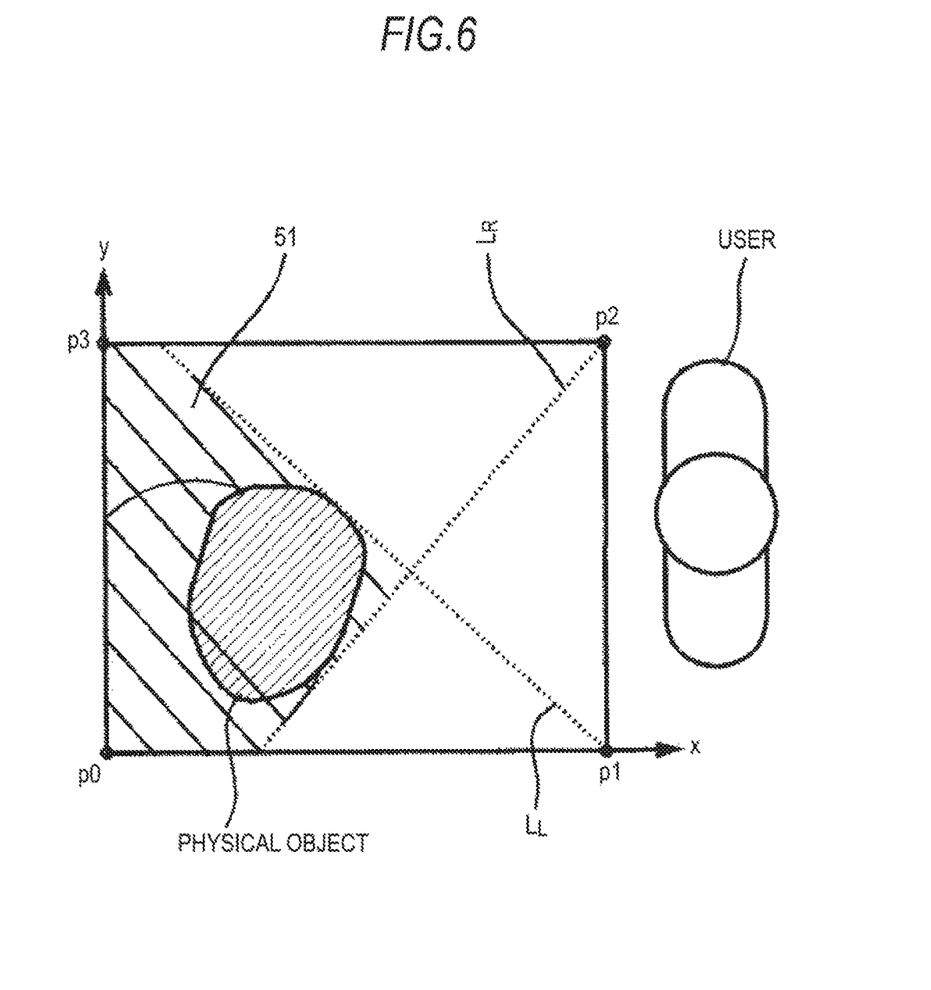
FIG. 6 is a diagram illustrating a non-display area setting method.

FIG. 6 shows a case where the user is located on the side of p1 and p2. In this case, the straight line LL passes through the vertex p1 and thus is expressed by Expression (5).

Straight line $LL$: $y-0=a(x-X)$ (5)

A function F(x, y) expressed by Expression (6) is defined on the basis of Expression (5).

Function $F(x,y)=y-0-a(x-X)$ (6)

The values of the function F(x, y) for all points c $(x_c, y_c)$ in the existing closed curve C, parameter a is made to increase toward 0 from the negative infinity, and parameter a when the value of the function F(x, y) is first 0 is employed as the slope of the straight line $L_L$.

The straight line $L_R$ is determined similarly. That is, the straight line $L_R$ passes through the vertex p2 and thus is expressed by Expression (7).

Straight line $L_R$: $y-Y=a(x-X)$ (7)

A function F(x, y) expressed by Expression (8) is defined on the basis of Expression (7).

Function $F(x,y)=y-Y-a(x-X)$ (8)

The values of the function F(x, y) for all points $c(x_c, y_c)$ in the existing closed curve C are calculated, parameter a is made to decrease toward 0 from the positive infinity, and parameter a when the value of the function F(x, y) is first 0 is employed as the slope of the straight line $L_R$.

When the user is located on the side of p2 and p3 and when the user is located on the side of p3 and p0, the straight lines $L_L$ and $L_R$ are determined similarly.

The area on the user side with the determined straight lines $L_L$ and $L_R$ as a boundary is set as the display area and the other area is set as the non-display area. A substantially triangular area which may appear between the display area and the closed curve C of the physical object may be set as the display area.

Figure 7:
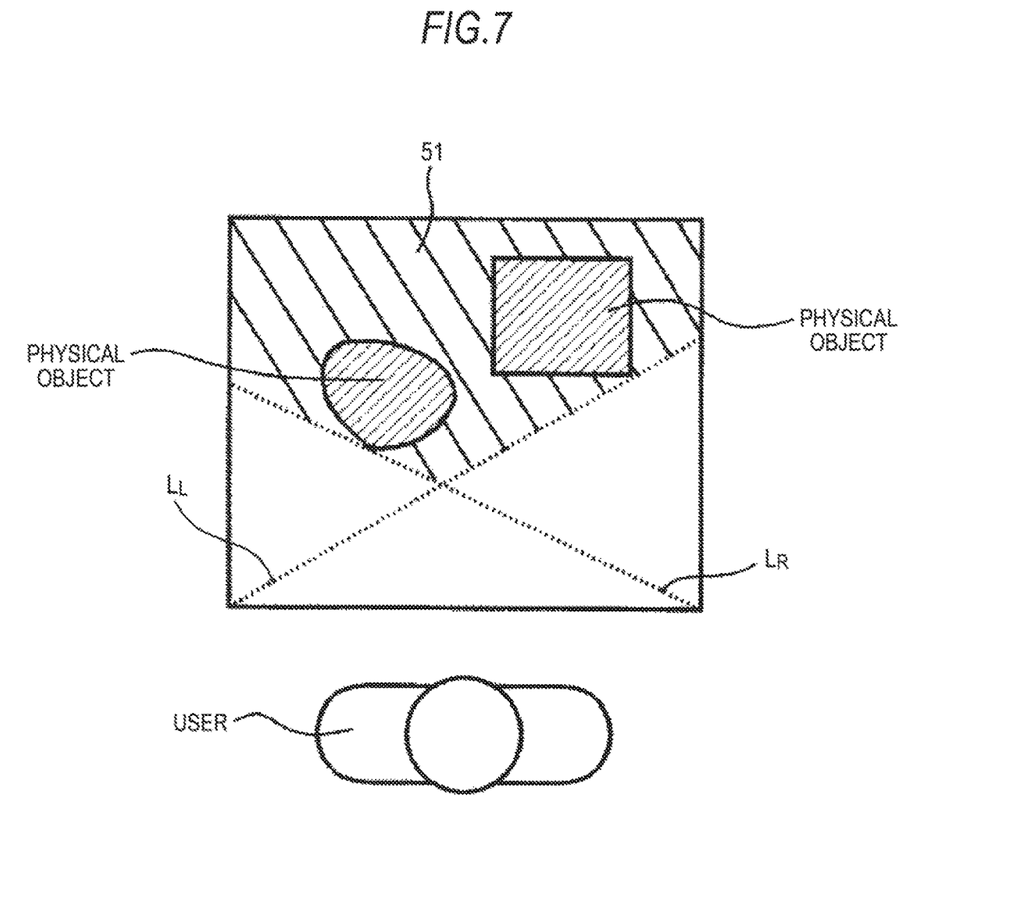
FIG. 7 is a diagram illustrating a non-display area setting method.

FIG. 7 shows a case where plural physical objects are placed on the display 30. In this case, the non-display area is determined for each physical object and the logical sum thereof is set as the non-display area as a whole.

In this embodiment, the area on the user side with the straight lines $L_L$ and $L_R$ as a boundary is set as the display area. On the contrary, the area on the user side with the straight lines $L_L$ and $L_R$ as a boundary may be changed to the non-display area. This change can be used in the step of concealing information of users from the users, for example, when playing cards, mah-jongg, and the like by the use of the information processing apparatus 20.

FIG. 4 will be referred to again. The display signal output unit 27 supplies the display signal input from the display signal generating unit 22 to the display 30. The display 30 having an imaging unit built therein, which is disposed on the surface of a table or a counter displays a picture corresponding to the display signal supplied from the display signal output unit 27. The display 30 having an imaging unit built therein includes an imaging unit 50 therein. The imaging unit 50 images the physical object placed on the display 30 from the inside under the control of the image signal acquiring unit 23 and outputs an image signal, which is obtained as a result and represents the shape of the bottom surface (the surface in contact with the display 30) of the physical object, to the image signal acquiring unit 23.

Figure 8:
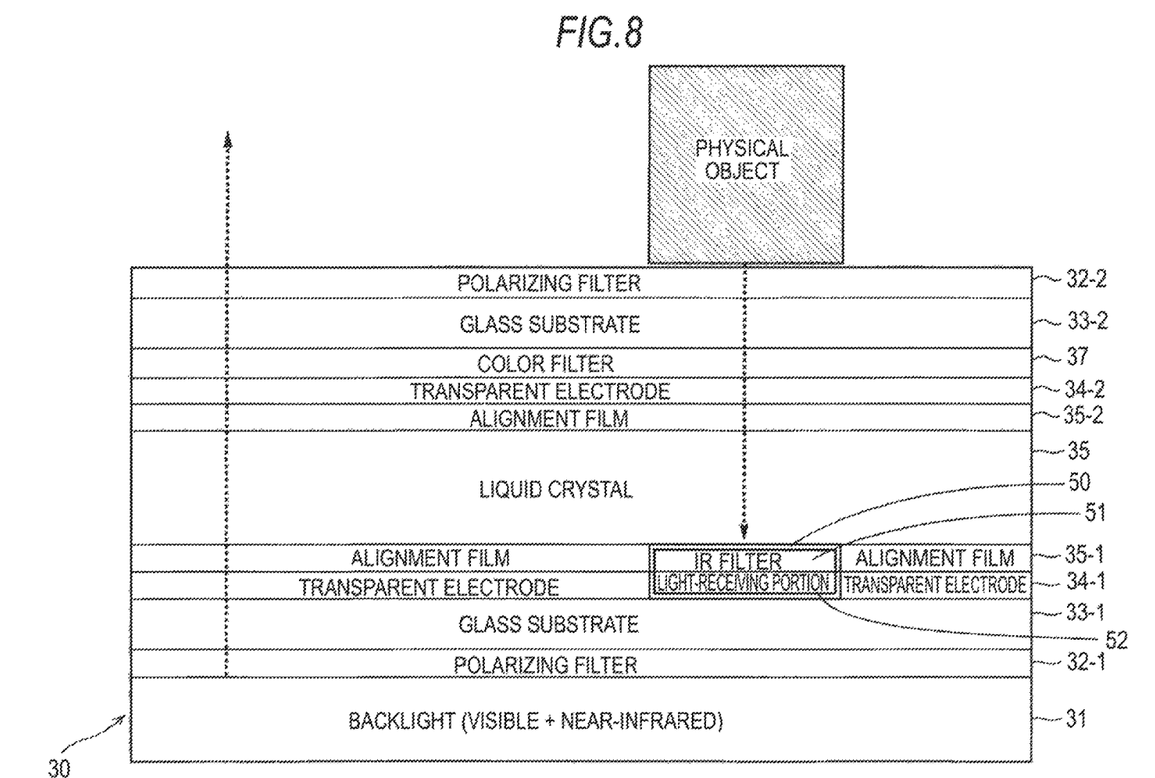
FIG. 8 is a sectional view illustrating the configuration of a display having an imaging unit built therein.

FIG. 8 is a sectional view illustrating the configuration of the display 30 having an imaging unit built therein.

In the display 30 having an imaging unit built therein, a backlight 31, a polarizing filter 32-1, a glass substrate 33-1, a transparent electrode 34-1, an alignment film 35-1, a liquid crystal 36, an alignment film 35-2, a transparent electrode 34-2, a color filter 37, a glass substrate 33-2, and a polarizing filter 32-2 are stacked sequentially from the inside thereof. An imaging unit 50 capturing an image using near-infrared light is disposed inside the glass substrates 33-1 and 33-2. A touch panel or the like sensing the user's operation input may be additionally stacked on the polarizing filter 32-2.

That is, the display 30 having an imaging unit built therein has a structure in which the imaging unit 50 is built in the general configuration of a liquid crystal display. Here, it is assumed that the backlight 31 emits near-infrared light (800 to 900 nm), which is applied to the bottom surface of the physical object to enable the imaging unit 50 to receive the reflected, along with visible light for displaying a picture.

The imaging unit 50 includes an IR filter 51 transmitting only near-infrared light and a light-receiving portion 52 receiving the near-infrared light and converting the received near-infrared light into an image signal. The light-receiving portion 52 can employ, for example, a system using photocurrent generated in an active layer or a system using accumulation of electric charges generated due to absorption of light. Since the imaging units 50 are two-dimensionally and periodically arranged to correspond to the respective pixels to be displayed or to groups each including a predetermined number of pixels, image signals output from all the imaging units 50 represent the bottom surface of the placed physical object.

[Actions]

Figure 9:
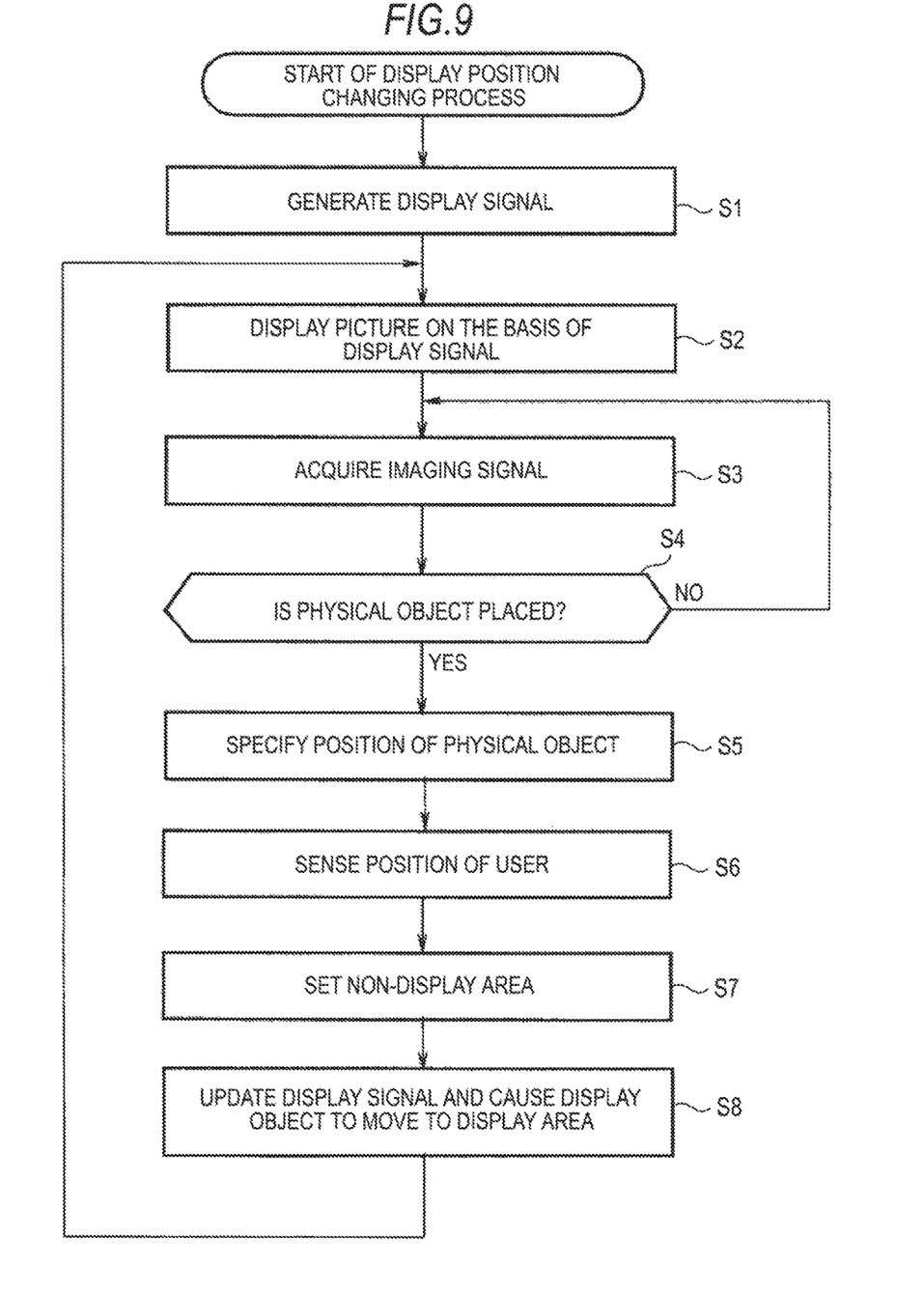
FIG. 9 is a flowchart illustrating a display position changing process.

A display position changing process in the information processing apparatus 20 will be described below. FIG. 9 is a flowchart illustrating the display position changing process.

In step S1, the display signal generating unit 22 generates a display signal for displaying a picture including a display object and the like on the display 30 having an imaging unit built therein on the basis of the operation signal corresponding to the user's operation and supplies the generated display signal to the display signal output unit 27.

In step S2, the display signal output unit 27 supplies the display signal input from the display signal generating unit 22 to the display 30 having an imaging unit built therein. The display 30 having an imaging unit built therein displays a picture corresponding to the display signal supplied from the display signal output unit 27.

In step S3, the image signal acquiring unit 23 acquires an image signal from the display 30 having an imaging unit built therein and outputs the acquired image signal to the physical object detecting unit 24. In step S4, the physical object detecting unit 24 determines whether a physical object is placed on the display 30 on the basis of the image signal from the display 30. When it is determined that a physical object is not placed on the display, the flow of processes is returned to step S3 and the processes subsequent thereto are repeated.

When it is determined in step S4 that a physical object is placed on the display 30, the flow of processes goes to step S5. In step S5, the physical object detecting unit 24 specifies the position of the physical object placed on the display on the basis of the image signal and notifies the non-display area setting unit 26 of a closed curve C representing the profile of the physical object.

In step S6, the user sensing unit 25 senses the side on which the user is located out of four sides surrounding the display 30 and notifies the non-display area setting unit 26 of the sensed side. In step S7, the non-display area setting unit 26 sets a non-display area on the basis of the closed curve representing the profile of the physical object placed on the display 30 and the position of the user and notifies the display signal generating unit 22 of the position information of the non-display area.

In step S8, the display signal generating unit 22 updates the display signal so as not to locate the display object in the non-display area on the basis of the position information of the non-display area notified from the non-display area setting unit 26 and supplies the updated display signal to the display signal output unit 27. Thereafter, the flow of processes is returned to step S2 and the processes subsequent thereto are repeated. Hitherto, the display position changing process has been described.

According to the display position changing process, even when a physical object is placed on the display 30 having an imaging unit built therein, it is possible to suppress difficulty in watching a display object in a picture regardless of the height.

Figure 10A:
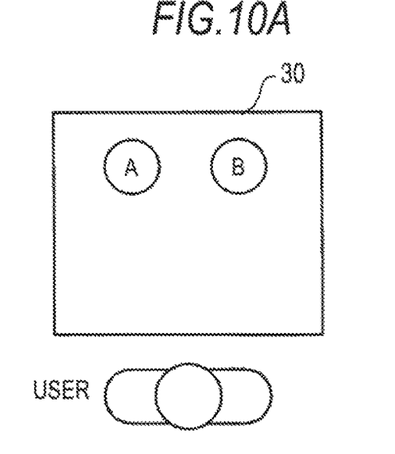
FIGS. 10A to 10C are diagrams illustrating a movement trace of a display object.
Figure 10B:
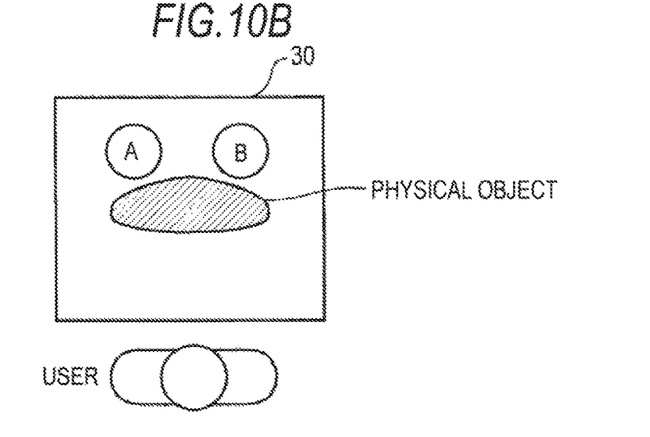
Figure 10C:
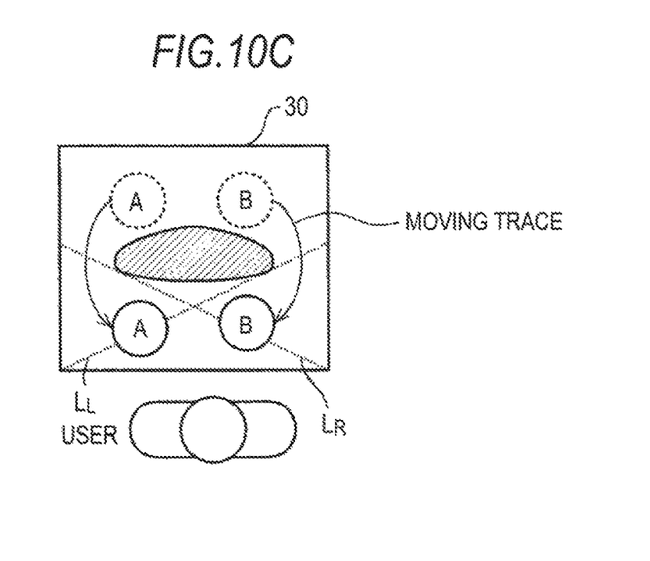

When changing the display position of the display object, the display position may be instantaneously changed or the moving trace of the display object may be visible. The moving trace may be a linear trace or a moving trace making a detour of the physical object, for example, as shown in FIGS. 10A to 10C.

The above-mentioned flow of processes may be carried out by hardware or by software. When the flow of processes is carried out by software, a program constituting the software is installed in a computer mounted on dedicated hardware or a general-purpose personal computer which can perform various functions by installing various programs from a program recording medium.

Figure 11:
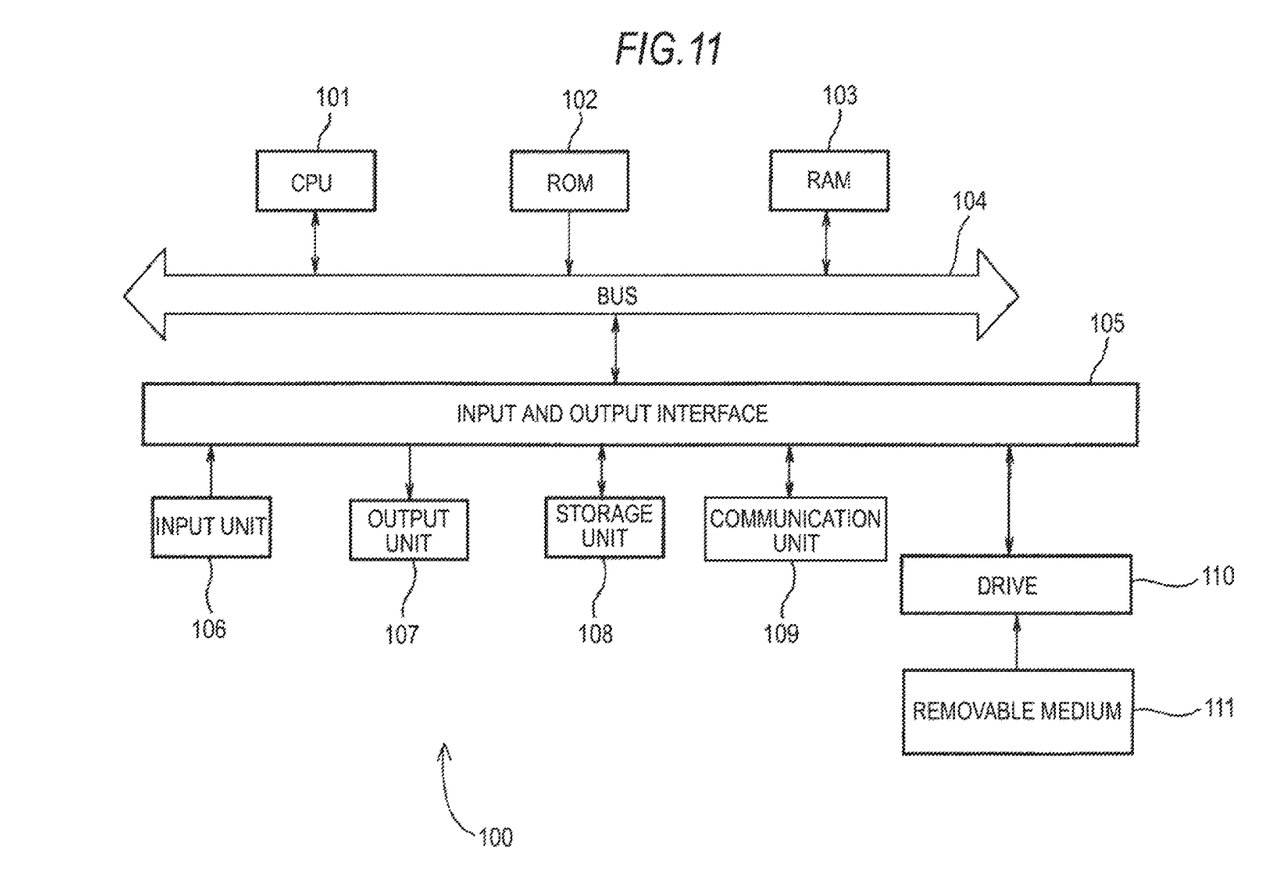
FIG. 11 is a block diagram illustrating the configuration of a computer.

FIG. 11 is a block diagram illustrating the hardware configuration of a computer executing the flow of processes through the use of the program.

In the computer 100, a central processing unit (CPU) 101, a read only memory (ROM) 102, and a random access memory (RAM) 103 are connected to each other via a bus 104.

An input and output interface 105 is further connected to the bus 104. The input and output interface 105 is connected to an input unit 106 including a keyboard, a mouse, and a microphone, an output unit 107 including a display and a speaker, a storage unit 108 including a hard disk or a nonvolatile memory, a communication unit 109 including a network interface, and a drive 210 driving a removable medium 211 such as a magnetic disk, an optical disk, a magneto-optical disk, and a semiconductor memory.

In the computer 100 having the above-mentioned configuration, the CPU 101 performs the above-mentioned flow of processes, for example, by loading the program stored in the storage unit 108 to the RAM 103 via the input and output interface 105 and the bus 104 and executing the loaded program.

The program executed by the computer may be a program performing the flow of processes in time series in the order described in the present disclosure or may be a program performing the flow of processes in parallel or at a demanded time such as a called time.

The program may be processed by a single computer or may be distributed and processed by plural computers. The program may be transmitted to a remote computer and may be executed thereby.

Particular embodiments of the present disclosure include the following.

(1) An image display method including: detecting a position of a user; detecting a position of a physical object; and defining a non-display area of a display based on the position of the user and the position of the physical object.

(2) The method according to (1), further including modifying an image to be displayed on the display to move a display object outside the non-display area.

(3) The method according to (1) or (2), further including modifying an image to be displayed on the display to move a display object into the non-display area.

(4) The method according to any one of (1) to (3), wherein detecting the physical object includes detecting a closed curve representing the physical object.

(5) The method according to (4), wherein the non-display area is defined on the basis of the closed curve.

(6) The method according to any one (1) to (5), wherein the non-display area is defined according to two lines which partition a surface of the display.

(7) The method according to any one of (1) to (6), wherein defining a non-display area includes defining a non-display area based on respective positions of two or more physical objects and the position of the user, and wherein the non-display area is determined by determining respective non-display areas for the physical objects and generating a logical sum of the respective non-display areas.

(8) The method according to any one of (1) to (7), wherein detecting the physical object comprises using an imaging unit.

(9) The method according to (8), wherein the imaging unit is a near-infrared imaging unit.

(10) The method according to any one of (1) to (9), wherein detecting the position of the user includes at least one of using an infrared sensor, using an ultrasonic sensor, using a human heat radiation sensor, and detecting a profile of the user's palm.

(11) An image display apparatus including a processing circuit for detecting a position of a user, detecting a position of a physical object, and defining a non-display area of a display based on the position of the user and the position of the physical object.

(12) The apparatus according to (11), wherein the display is integral to the apparatus.

(13) The apparatus according to (11) or (12), further including an imaging unit for detecting the physical object.

(14) The apparatus according to (13), wherein the imaging unit is a near-infrared imaging unit.

(15) The apparatus according to (13) or (14), wherein the display includes a backlight and a liquid crystal, and the imaging unit is positioned between the backlight and the liquid crystal.

(16) The apparatus according to any one of (11) to (16), wherein an image to be displayed on the display is modified to move a display object outside the non-display area.

(17) The apparatus according to (16), wherein the display object is moved gradually and a trace of the display object's movement is displayed.

(18) The apparatus according to any one of (11) to (17), wherein an image to be displayed on the display is modified to move a display object into the non-display area.

(19) An image display apparatus including: means for detecting a position of a user; means for detecting a position of a physical object; and means for defining a non-display area of a display based on the position of the user and the position of the physical object.

(20) A non-transitory computer-readable medium having stored thereon a computer-readable program for implementing an image display method including: detecting a position of a user; detecting a position of a physical object; and defining a non-display area of a display based on the position of the user and the position of the physical object.

The present disclosure is not limited to the above-mentioned embodiments, but may be modified in various forms without departing from the concept of the present disclosure.

What is claimed is:

1. An information processing apparatus, comprising:
   circuitry configured to:
   control a display screen to display content at a first position on the display screen;
   detect first position information of a first object on the display screen;
   detect second position information of a user's body part;
   determine a plurality of areas on the display screen, based on the second position information and tangent lines set corresponding to the first object;
   move the content to a second position in a first area of the plurality of areas on the display screen based on a relation between the first position information and the second position information; and
   control the display screen to display a trace of the movement of the content from the first position to the second position.

2. The information processing apparatus according to claim 1, further comprising an imaging unit configured to detect the first object on the display screen.

3. The information processing apparatus according to claim 2, wherein the imaging unit is a near-infrared imaging unit.

4. The information processing apparatus according to claim 2,
   wherein the display screen further comprises a backlight and a liquid crystal display, and
   wherein the imaging unit is between the backlight and the liquid crystal display.

5. The information processing apparatus according to claim 1, wherein the circuitry is further configured to:
   define the first area of the plurality of areas of the display screen based on the first position information and the second position information, wherein the second position on the display screen is outside the first area.

6. The information processing apparatus according to claim 5, wherein the trace of the movement of the content makes a detour of the first object.

7. The information processing apparatus according to claim 1, wherein the circuitry is further configured to:
   define the first area of the plurality of areas of the display screen based on the first position information and the second position information, wherein the second position on the display screen is within the first area.

8. An information processing method, comprising:
   in an information processing apparatus:
   controlling a display screen to display content at a first position on the display screen;
   detecting first position information of a first object on the display screen;
   detecting second position information of a user's body part;

determining a plurality of areas on the display screen, based on the second position information and tangent lines set corresponding to the first object;

moving the content to a second position in a first area of the plurality of areas on the display screen based on a relation between the first position information and the second position information; and controlling the display screen to display a trace of the movement of the content from the first position to the second position.

9. A non-transitory computer-readable medium having stored thereon, computer-executable instructions, which when executed by an information processing apparatus, cause the information processing apparatus to execute operations, the operations comprising:

controlling a display screen to display content at a first position on the display screen;

detecting first position information of a first object on the display screen;

detecting second position information of a user's body part;

determining a plurality of areas on the display screen, based on the second position information and tangent lines set corresponding to the first object;

moving the content to a second position in a first area of the plurality of areas on the display screen based on a relation between the first position information and the second position information; and controlling the display screen to display a trace of the movement of the content from the first position to the second position.

10. The information processing apparatus according to claim 1, further comprising an imaging unit configured to:

detect a first profile of the first object based on the first position information; and detect a second profile of the user's body part based on the second position information.

11. The information processing apparatus according to claim 10, wherein the circuitry is further configured to:

set the first area of the plurality of areas on the display screen based on the first profile of the first object, wherein the second position on the display screen is outside the first area.

12. The information processing apparatus according to claim 1, wherein the circuitry is further configured to set the tangent lines to the first object based on the second position information.

* * * * *